United States Patent
Vollmer et al.

(10) Patent No.: US 6,248,700 B1
(45) Date of Patent: Jun. 19, 2001

(54) CARBOXYLATE-BASED WELL BORE TREATMENT FLUIDS

(75) Inventors: Daniel P. Vollmer; Robert L. Horton, both of Lafayette, LA (US)

(73) Assignee: Great Lakes Chemical, West Lafayette, IN (US)

( * ) Notice: Subject to any disclaimer, the term of this patent is extended or adjusted under 35 U.S.C. 154(b) by 0 days.

(21) Appl. No.: 09/185,795

(22) Filed: Nov. 4, 1998

Related U.S. Application Data

(60) Provisional application No. 60/064,550, filed on Nov. 5, 1997.

(51) Int. Cl.[7] .............................. C09K 3/00; C23F 11/00
(52) U.S. Cl. ........................ 507/277; 507/267; 507/939; 252/387; 252/389.62
(58) Field of Search .................................. 507/267, 277, 507/939; 252/387, 389.62

(56) References Cited

U.S. PATENT DOCUMENTS

| | | | |
|---|---|---|---|
| 2,722,516 | * 11/1955 | Merker | 252/389.62 |
| 4,401,624 | * 8/1983 | Atwater | 252/389.62 |
| 4,618,539 | 10/1986 | Jahnke et al. | |
| 5,202,058 | 4/1993 | Riggs, Jr. | |
| 5,330,683 | 7/1994 | Sufrin | |
| 5,407,471 | 4/1995 | Rohr et al. | |
| 5,507,861 | * 4/1996 | Caupin et al. | 252/389.62 |
| 5,510,057 | 4/1996 | Riggs | |
| 5,783,527 | 7/1998 | Dobson, Jr. et al. | |
| 5,789,351 | 8/1998 | Ahmed et al. | |

FOREIGN PATENT DOCUMENTS

| 2257703 | * 8/1975 | (FR) . |
|---|---|---|
| 97/26311 | * 7/1997 | (WO) . |

OTHER PUBLICATIONS

Esteso, M.A. et al., Journal of Solution Chemistry, vol. 20, No. 4, pp. 417–429, (1991).*

* cited by examiner

*Primary Examiner*—Philip Tucker
(74) *Attorney, Agent, or Firm*—Baker Botts L.L.P.

(57) ABSTRACT

This invention relates to novel compositions and methods whereby a carboxylate based brine solution is used in drilling and/or well bore treating operations to inhibit corrosion of fluid handling equipment. In one embodiment of the invention the carboxylate based brine solution consists of a carboxylate salt dissolved in water. This brine solution is used to prepare halide-free drilling fluids. Use of halide-free drilling fluids inhibits corrosion stainless steel surfaces of fluid handling equipment. In an alternative embodiment of the present invention a mixed salt brine containing a carboxylate salt and a halide salt is provided for use in a drilling and/or well bore treating operations.

40 Claims, 9 Drawing Sheets

CARBOXYLATE-BASED WELL BORE TREATMENT FLUIDS

CROSS-REFERENCE TO RELATED APPLICATION

The present application claims the benefit of U.S. Provisional Application Ser. No. 60/064,550 filed on Nov. 5, 1997, which is hereby incorporated by reference herein in its entirety.

FIELD OF THE INVENTION

This invention generally relates to preventing or reducing corrosion of metallic equipment used in the exploration of subterranean formations and to methods of using inventive aqueous base fluids to achieve this result. Certain aqueous base fluids are used in accordance with the invention in drilling, drill-in, completion, work-over, packer, well treating, testing, spacer, and hole abandonment fluids. More specifically, this invention is directed to (1) brine fluids exhibiting reduced corrosivity toward metallic fluid handling equipment, improved well control, better shale stability, and increased thermal stability for polysaccharide additives, and (2) methods of inhibiting corrosion of metallic pipe and drilling equipment using a base fluid selected in accordance with the invention.

BACKGROUND OF THE INVENTION

Oil well tubular or pipe corrosion is a major concern for the drilling industry. Corroded pipe and other fluid handling equipment is expensive to replace, failure and/or replacement of equipment typically results in significant losses in well production, and damaged equipment and resulting lost fluid can be hazardous to the operators and the environment. Corrosion is a significant concern in this industry because metallic drilling/fluid handling equipment is exposed to harsh conditions, and fluids used to prepare a well for production are corrosive to fluid handling equipment.

Most fluids used in drill operations include halide brines as base fluids because these brines exhibit a number of desirable features for such use. For example, halide brines can be prepared that have relatively high densities, and the use of halide brines typically results in less formation damage than other base fluids. Conventional brines, however, are highly conductive media and promote corrosion of steel. Furthermore, many well fields have high concentrations of carbon dioxide ("$CO_2$") and/or hydrogen sulfide ("$H_2S$") dissolved in the strata and, consequently, these substances are present in the well bore fluid. Carbon dioxide and $H_2S$ can be highly corrosive to well equipment—particularly to steel pipes. Thus, when selecting equipment for use in an operation and when selecting a base fluid for use, one must take into account whether $CO_2$ and/or $H_2S$ are present and also consider what measures may be taken to counter the corrosivity of halide brines In some cases, particularly where $CO_2$ and/or $H_2S$ are not present in an oil field, halide-induced corrosion can be reduced to acceptable levels, for example, by the selection of pipe made from carbon steel (which is more resistant to halide brine-induced corrosion than stainless steel) and by adding corrosion inhibitors to the fluid. There are a variety of inhibitors available to prevent this type of corrosion, and it is believed that these inhibitors affect corrosion by reducing the potential of the corrosion reaction or by removing some of the agents that initiate corrosion, such as dissolved oxygen. However, as temperature increases, as would occur as well bores reach depths of about 15,000 feet and deeper, corrosion inhibitors often become ineffective or require unacceptably high concentrations for adequate corrosion inhibition.

Additional factors must be considered, however, in an environment comprising $CO_2$ and/or $H_2S$. Carbon steel is highly susceptible to $CO_2$-induced corrosion. Therefore, in $CO_2$ environments, Ikeda, et al. recommend using 2% Cr steel at temperatures below 140° F. (60° C.), 9% Cr up to 212° F. (100° C.), and 13 Cr up to 302° F. (150° C.). (A. Ikeda et al., "$CO_2$ Corrosion Behavior and Mechanism of Carbon Steel and Alloy Steel," Paper No. 45, Corrosion 83, Anaheim, Calif., 1983). However, since most conventional completion brines contain halides that are known to cause pitting-type corrosion in some stainless CRA (corrosion resistant alloy) steels, (M. G. Fontana et al., Corrosion Engineering, McGraw-Hill, 1967), the prevention or reduction of $CO_2$-induced corrosion by using stainless steel results in a greater risk of halide-induced corrosion.

Therefore, an operator of drilling and fluid control equipment is left with a difficult decision in an oil field that comprises $CO_2$. By solving one problem, another is created. The operator can (1) prevent the corrosion problem by perforating in oil-based mud and accept the formation damage that occurs, or (2) complete the well with a halide brine, using stainless steel equipment, and accept the possibility of replacing the stainless steel pipe when it fails or corrodes to an unacceptable level from contact with halides, or (3) use a carbon steel pipe and keep replacing the pipe and related equipment as it fails in the corrosive carbon dioxide environment. In some instances, use of very costly Hastelloy tubing may provide a partial solution to the corrosion problem so that the completion can be done in halide brine, but this cannot prevent corrosion of the well casing, which is typically carbon steel.

In view of this background, there is a great need in the art for methods and compositions that can be used in connection with drilling and well-bore fluids irrespective of the type of steel present in tubulars, pipes and other metallic equipment (i.e., stainless steel or carbon steel) to reduce corrosion thereof. The present invention provides such compositions and methods, thereby overcoming corrosion problems described above. Perhaps most remarkably, the invention may be used in an environment comprising $CO_2$ and/or $H_2S$ to significantly prolong the useful life of metallic equipment, particularly carbon steel pipe and related fluid handling equipment.

SUMMARY OF THE INVENTION

Thus, there are provided in the present invention methods of inhibiting corrosion on a metal surface in contact with a wellbore treatment fluid containing a brine, the method comprising: Providing an aqueous composition including a carboxylate salt; contacting a metal surface with the aqueous composition; and maintaining a concentration of about 1.0 wt % to about 84 wt % of the carboxylate salt in the aqueous composition for a time sufficient to inhibit corrosion on the metal surface.

There are also provided methods of conditioning a metal surface in contact with an aqueous brine having therein carbon dioxide, the method comprising: Providing an aqueous composition including a carboxylate salt, contacting the metal surface with the aqueous composition for a time sufficient to condition the metal surface.

The invention also provides a clear base fluid comprising sodium bromide and sodium formate in a ratio whereby the fluid has a density of from about 10.5 ppg to about 11 ppg, and wherein the fluid exhibits a true crystallization temperature lower than a substantially pure sodium bromide or sodium formate brine of substantially the same density.

Accordingly, it is an object of the present invention to provide compositions and methods for preventing or reducing corrosion of metallic equipment used in the exploration of subterranean formations.

It is also an object of the invention to provide compositions which advantageously have low true crystallization temperatures, and which therefore may be advantageously used in a relatively cold environment.

Additional features, objects and advantages of the invention will be apparent from the specification and the Figures appended hereto.

DETAILED DESCRIPTION OF THE INVENTION

Figure 1:
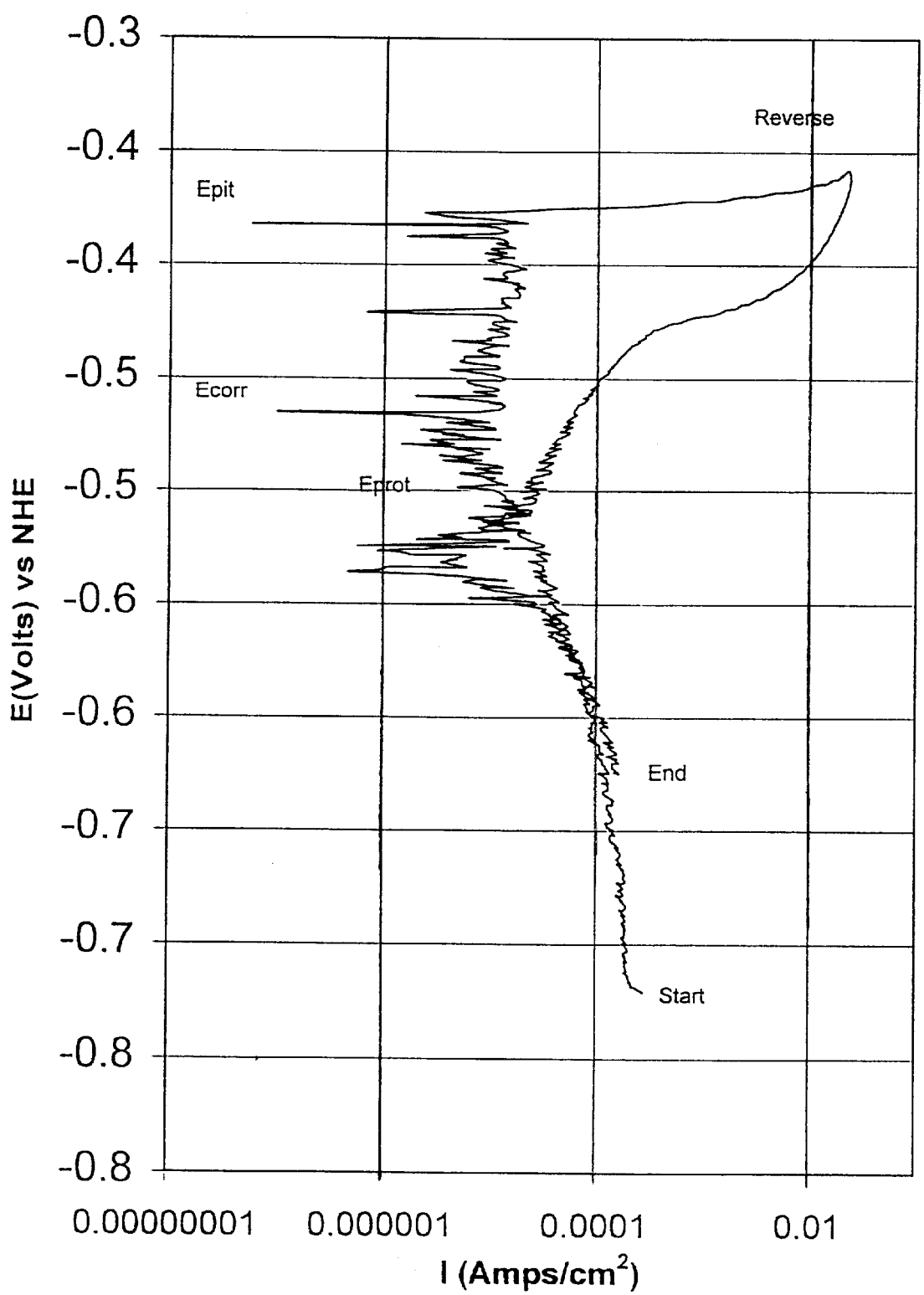
FIG. 1 is a graph illustrating the potentiodynamic polarization of a stainless steel coupon in a NaCl 9.5 ppg (1.14 g/ml) brine solution under $N_2$ at 750 psig 300° F. (148.9° C.).

For the purposes of promoting an understanding of the principles of the present invention, reference will now be made to certain embodiments, and specific language will be used to describe the same. It will nevertheless be understood that no limitation of the scope of the invention is intended thereby. Any alterations and further modification in the described processes, systems, or devices, and any further applications of the principles of the invention as described herein are contemplated as would normally occur to one skilled in the art to which the invention relates.

Generally, this invention relates to the novel use of methods and compositions in drilling and wellbore treatment operations to prevent or reduce corrosion of a wide variety of metallic well equipment. Examples of well equipment that often become corroded include drill string or work-over tubing, production tubing, or any other steel surfaces that contact a drilling and/or well treatment fluid, such as downhole pumps, gas separators, packer mandrels, tubing hangers, safety valves, slide pocket mandrels, and wire aligned tools. The invention finds advantageous use in connection with a wide variety of aqueous fluids in contact with metallic equipment, and inventive base fluids may be used to replace conventional brines previously used in such fluids.

In one preferred aspect, therefore, the invention provides excellent base fluids. As used herein, the term "base fluid" is intended to refer to an aqueous solution that finds advantageous use, either alone or with additives therein, in a wide variety of drilling and wellbore treatment operations. A base fluid selected for use in accordance with the invention preferably comprises an aqueous solution of a carboxylate salt. Optionally, other salts and additives can be added to the base fluid in preferred aspects of the invention, as discussed more fully below, such as, for example, halide salts, weight-up agents, fluid loss additives, pH control additives, viscosifiers, and emulsifiers. To achieve the advantageous result of the invention, however, it is preferred that a fluid prepared in accordance with the invention to be utilized in contact with metallic equipment have a carboxylate concentration maintained at a level of at least about 1.0 wt %, more preferably at least about 5 wt %.

When the invention is used in connection with wellbores that contain high concentrations of carbon dioxide, corrosion on well drilling equipment, particularly carbon steel and stainless steel surfaces, may be reduced significantly. Furthermore, a base fluid prepared or selected for use according to the present invention imparts to a final wellbore treatment fluid enhanced thermal stability, reduced fluid loss, and lower formation damage. It is understood for the purposes of the present invention that the term "wellbore treatment fluid" encompasses a wide variety of fluids used to prepare and operate a well. Such fluids include drill-in, completion, work-over, packer, well treating, testing, spacer, and hole abandonment fluids. In the course of testing inventive fluids, it was found that, in the presence of $CO_2$ and/or $H_2S$, the fluids form an excellent passivated layer on carbon steel and stainless steel tubulars, thereby inhibiting corrosion of the respective steel.

The invention is particularly useful in one aspect in connection with clear brine fluids. Clear brine fluids for the purposes of this invention are brine fluids containing dissolved salts, but essentially free from any solid particles or precipitates. The clear brine fluids can be, but are not required to be, saturated with the dissolved salts. Furthermore, it is understood that solubility is dependent upon the temperature of the fluid. Thus, a clear brine prepared at 60° F. (15.5° C.) may contain solids or precipitate if it is cooled. Furthermore, a brine containing solids may become clear when it is heated.

The term "true crystallization temperature" (TCT) for the purposes of describing the invention is used to refer to the temperature at which a brine solution becomes saturated with one or more of the salts included therein. At this temperature, the least soluble salt becomes insoluble and precipitates. As a brine solution is cooled, crystals begin to form in the liquid as they become insoluble in the liquid at a temperature below the crystallization point. As crystals form, energy resulting from the heat of crystallization will be released and the temperature of the brine will then rise and/or level off and stabilize briefly. The TCT is determined by identifying the maximum temperature reached after the first crystals form. As the crystallization process continues, the solution concentration is altered, resulting in a change in the crystallization temperature of the remaining solution. The temperature of the brine solution may then continue to decrease with continued cooling.

Experimentally, TCT is measured by first super cooling a brine solution in a cold bath until crystals form. The solids containing brine solution is warmed until all the crystals re-dissolve. The warmed clear brine solution is cooled in the cold bath again, and the solution is stirred to prevent super cooling. The temperature of the brine solution is monitored and the temperature at which the first crystals precipitate is noted. After the first crystals form, the temperature of the brine solution will either rise slightly or level off as the heat of crystallization is released. The maximum temperature (or the temperature level at the inflection point) after the first crystals form is recorded as the TCT. A second cooling cycle is repeated to confirm the TCT. (See API RP13J "Recommended Practice for Testing Heavy Brines: Section 2—Brine Crystallization Temperature"; Dow Chemical U.S.A Publication B-600-180-79 "Crystallization Point Determination for Dense Fluids"; and Dresser Industries, Inc. Publication, "New Method Cuts Cost of Finding Crystallization Points of Solids-Free Heavy Brines" Oil and Gas Journal, Feb. 8, 1982).

A base fluid selected in accordance with the invention is preferably an aqueous brine solution comprising water having dissolved therein carboxylate salt, more preferably a lower alkyl carboxylate salt, for example a C1 to C4 alkyl carboxylate. It will be appreciated by those skilled in the art that carboxylate salts having more carbon atoms or longer alkyl chains are less soluble in the aqueous medium. To provide fluids having greater densities, it is often preferable to use carboxylate salts having few carbon atoms such as formate and acetate salts. Specific examples of preferred lower carboxylate salts for use in this invention include formate, acetate, propionate, butyrate, and 2-methyl propionate. The most preferred carboxylate salts for use with the present invention are formate and acetate salts.

The cation in a preferred carboxylate salt may be selected from a wide variety of mono- or di-valent cations. Preferably the cation is selected from alkali metal or alkaline earth metal cations. The most preferable cation for use in the present invention is sodium. The density and the true crystallization temperature (TCT) of the resulting brine are affected by the nature of the cations for the alkyl carboxylate salts and the solubility of the respective salts. In general, the solubility of a specific alkyl carboxylate in aqueous medium increases as the cation is exchanged from sodium to potassium to cesium, and the change in solubility affects the density of the saturated solutions. The solubility of a carboxylate salt can also be affected by the addition of other salts, such as halide salts.

A clear brine containing one or more carboxylate salts prepared or selected in accordance with the present invention advantageously has a relatively low TCT, making the fluid particularly useful in cold temperature applications. Furthermore, the brine is significantly less harmful to the environment than many other drill fluids known in the prior art. For example, oil-based fluids can be particularly harmful to the environment. A clear aqueous brine fluid prepared according to the present invention passes the Gulf of Mexico regulatory $LC_{50}$ toxicity test (i.e., greater than 500,000 ppm for mysid shrimp larvae.)

In one embodiment of the present invention, a clear base fluid is provided which comprises a single carboxylate salt and has a density of about 8 ppg to about 19 ppg, preferably about 8 ppg (0.96 g/ml) to about 10.9 ppg (1.31 g/ml) at about 60° F. (15.6° C.) or about 11.0 ppg (1.32 g/ml) at about 70° F. (21° C.). A preferred clear base fluid of the present invention has a density of about 8.4 ppg (1.02 g/ml) to about 9.8 ppg (1.16 g/ml), and comprises from about 1 wt % to about 80 wt % of a carboxylate salt in an aqueous solution. More preferably the clear base solution contains about 3 wt % to about 40 wt %, most preferably about 5 wt % to about 30 wt % of a carboxylate salt. In a preferred embodiment, the present invention provides a clear base solution having about 3 wt % to about 45 wt % of sodium formate at 70° F. (21° C.) to provide a base fluid having about 8.5 ppg (1.02 g/ml) to about 11 ppg (1.32 g/ml). In an alternate preferred embodiment, there is provided a clear brine solution having about 1 wt % to about 30 wt % of sodium acetate at 70° F. (21° C.) to provide a base fluid having a density of about 8.4 ppg (1.01 g/ml) to about 9.8 ppg (1.18 g/ml).

There is also provided in accordance with the present invention a solids-containing base fluid. The solids-containing fluid may include, for example, a greater amount of the carboxylate salt than can be dissolved in the aqueous medium at a given temperature, such as, for example, 60° F. (156° C.). Thus, a solids-containing fluid can include about 30 wt % to about 80 wt % of the carboxylate salt. In addition, this fluid can include a variety of other additives, both soluble and insoluble additives, such as, for example, viscosifiers, bridging agents, sized particles, weight-up agents, and weighting agents, many of which are known in the art and are readily available commercially.

While certain preferred embodiments of the present invention utilize brines that are essentially free from non-carboxylate salts, in alternative embodiments, the base solution can include other salts, such as, for example, halide salts. A wide variety of halide salts are useful in an alternative embodiment of this invention. Alkali metal and alkaline earth metal halide salts, such as, for example, NaBr, NaCl, KCl, and KBr, can be included in the base solution in certain aspects of the invention. In preferred embodiments, the carboxylate salt and the halide salt in a given fluid both contain the same cationic species. For example, in one preferred embodiment of the present invention, the base solution includes about 1 wt % to about 25 wt % sodium acetate and about 1 wt % to about 45 wt % sodium bromide. In alternative embodiments the base solution comprises cesium acetate and cesium halide salt. It has been determined that when the carboxylate and the halide salt have different cationic counter ions, one or the other salt is more likely to precipitate at a lower salt concentration than when the cationic counter ions are the same species. Furthermore, the true crystallization temperature (TCT) for a base fluid can be significantly lowered by combining carboxylate salts and halide salts having the same cationic counter ions in the brine solution. Base fluids having a lower TCT are particularly useful in drill fluids in cold temperature applications.

A clear base solution that includes both halide salts and carboxylate salts can be prepared to have a greater density than a clear brine solution containing either the halide salt or a carboxylate salt individually. For example, a clear base fluid having a maximum density of about 12.8 ppg (1.53 g/ml) at 70° F. (21° C.) can be prepared with NaBr. A clear base fluid having a maximum density of about 11.0 ppg (1.32 g/ml) can be prepared with sodium formate. However, a clear brine solution containing both NaBr and sodium formate can be prepared to have a maximum density of about 13.0 ppg (1.56 g/ml) at 70° F. (21° C.).

The base solution for use in the present invention may include monovalent salts, preferably alkali metal halide salts. For example, salts having Li, K, Na, Rb and Cs cations and F, Cl, Br and I anions. The brine fluids can be provided with sufficient density without the necessity of using calcium or zinc salts particularly calcium or zinc halide salts. These calcium and zinc free base solutions having carboxylate salts and alkali metal salts are compatible with most formations. In pre-application testing, this base solution displayed an ability to stimulate limestone formations to enhance well production.

Use of high density brines is also within the scope of the present invention. Preferably, a dense base fluid for use with this invention is a calcium-free halides or non-halides brine fluid, having a fluid density above about 18 ppg (2.16 g/ml). Use of cesium salts such as cesium formate and cesium acetate with or without added halide salts provides high density brines that can be used in very deep well bores to counter balance the high pressure exerted by the fluid in the surrounding strata.

While the invention achieves its advantageous result in a wide variety of environments, the use of a base fluid prepared according to the present invention is particularly advantageous in wellbores that have a $CO_2$ environment. While calcium salts are conventionally used in fluids where relatively high densities are desired, such as, for example, in a very deep wellbore, calcium salts are not suitable for use in a $CO_2$ environment. In such an environment, the $CO_2$ becomes dissolved or entrained in the fluid and causes the calcium to precipitate out of solution as calcium carbonate. In accordance with the invention, this problem is overcome by utilizing a brine comprising a relatively heavy carboxylate salt, such as, for example, cesium formate, cesium acetate or a combination thereof, and optionally also comprising a calcium-free halide salt. A calcium-free base fluid in accordance with the invention can be prepared to include a sufficient amount of a heavy carboxylate salt to have a density of at least about 18 ppg (2.16 g/ml). Use of calcium-free halide brine fluids provided in the present invention are therefore particularly useful in wellbores having carbon dioxide present.

Wells having a high $CO_2$ concentration are also particularly corrosive to carbon steel equipment, particularly well strings, drill strings, and other fluid handling equipment. Use of a base fluid that includes one or more carboxylate salts in accordance with the invention inhibits corrosion of the carbon steel surfaces. It has been determined that the use of brines comprising carboxylate salts results in the formation of a layer or film on steel surfaces. This film was not dissolved in inhibited hydrochloric acid solution. While it is not intended that the invention be limited by theory, it is thought that the corrosion of steel surfaces is inhibited by this layer or film by surface passification on the steel surface, particularly on carbon steel. Thus, a base solution selected according to the present invention may be advantageously used in connection with wellbores and drill systems that contain carbon steel pipe and related fluid handling in contact with carbon dioxide.

Use of a halide free base solution prepared according to this invention is also useful with stainless steel equipment, whether in a well bore that has a high carbon dioxide content or one with no carbon dioxide present. Stainless steel pipes are resistant to carbon dioxide induced corrosion; however, stainless steel pipes exhibit significantly high corrosion rates when contacted with halide-containing brines. Therefore, a brine solution that is essentially free from halide salts yet exhibits a sufficient density and rheological properties can be prepared according to the present invention for use with stainless steel equipment in well bores with or without a carbon dioxide environment. Use of an inventive brine solution in a drilling fluid reduces the potential for pitting or localized-type corrosion in stainless steels used in conventional well bore treatment methods.

A halide-free base solution prepared according to the present invention may be utilized in a wide variety of fluids that come into contact with metallic equipment, such as, for example, drilling, drill-in, completion, work-over, packer, well treating, testing, spacer, hole abandonment, completion or packer fluids. Furthermore, the base fluid can be used to replace a brine in completion and packer fluids. As stated above, an inventive fluid may contain a wide variety of additives. For example, a drilling fluid can include viscosifiers, weight-up agents (such as, for example, barite and hematite), buffering agents and/or fluid loss control agents.

Typically the viscosifier can be selected from clayey material and a wide variety of polymers; typical polymers include polysaccharides, polyacrylates, polyacrylamides or mixtures thereof. The polysaccharides include any of the known or commonly used galactomannan gums, derivatized galactomannan gums, cationic polysaccharides, anionic polysaccharides, starches, derivatives of starches cellulose polycellulose. Specific examples of glactomannan gums useful with the present invention include but are not limited to guar gum, xanthan gums, scleroglucan and known derivatives of these gums. Polysaccharides also include cellulose and cellulose derivatives such as carboxy ethyl cellulose, carboxy methyl cellulose, carboxymethyl hydroxyethyl cellulose, hydroxy ethyl cellulose and microbial polysaccharides such as succinoglycan polysaccharides and scleroglucan. Other viscosifying agents include polyvinyl alcohols, acrylamides, methacrylamides, clayey material such as bentonites, attapulgite, sepiolite, as well as fumed silica and fumed alumina.

Buffering agents or pH control additives are used in drilling fluids to maintain the desired pH of fluid. If the pH of the base fluid becomes too low, severe degradation of the included polymers, particularly the viscosifying agents results. Typical examples of buffering agents include, but are not limited to: sodium phosphate, sodium hydrogen phosphate, boric acid-sodium hydroxide, citric acid-sodium hydroxide; boric acid-borax; sodium bicarbonate; ammonium, sodium and potassium salts and bicarbonate and carbonate, dibasic phosphate, tribasic phosphate, lime, slaked lime, magnesium oxide, calcium oxide, and zinc oxide.

The fluid loss control and bridging agents may be soluble or suspended particles in the base fluid. In addition, fluid loss control agents can also comprise polymers. Thus, the fluid loss control pills can be classified as solids-free or solids-containing. One class of fluid loss control agents includes water and/or acid soluble particles that are deposited upon the walls of the wellbore. It is understood that the weighting agent and weight-up agents can serve as fluid loss control agents by deposition of solid salts on the rock face of the subterranean formation. The acid or water-soluble particles then can be removed upon perforation by introduction of water and/or aqueous acid solutions. One method of removing the water-soluble particles is to utilize an undersaturated brine that can dissolve the solid filter cake. The viscosifying agents listed above can also function as filter control agents. Furthermore, filter control agents can also include sized particles such as fine calcium carbonate $CaCO_3$ and silica flour. These particles are also bridging agents. The particles usually have an average size of about 1 to 10 microns. However, any substantially organic or inorganic pulverulent material (including starches and derivatized starch) may be employed as a fluid-loss control additive.

A base fluid prepared in accordance with the present invention is particularly useful for inhibiting corrosion of oil or gas containing pipelines. The presence of oil or gas has a beneficial effect of inhibiting the corrosive effect of entrained fluids containing $CO_2$ and/or salts by oil-wetting the pipes. However, if there is sufficient entrained aqueous fluid, "water-wetting" of the metal surface occurs, causing the water-wetted pipe to corrode. Use of a base fluid that includes carboxylates in the oil or gas carrying pipes serves to inhibit corrosion of the metal surfaces in contact with the fluids.

It is contemplated that methods and compositions described herein can be altered, rearranged, substituted, deleted, duplicated, combined, or added to other methods or compositions as would occur to those skilled in the art without departing from the spirit of the present invention. In addition, the various stages, steps, procedures, techniques, phases, and operations within these processes may be altered, rearranged, substituted, deleted, duplicated, or combined as would occur to those skilled in the art. All publications, patents, and patent applications cited in this specification are herein incorporated by reference as if each individual publication, patent, or patent application was specifically and individually indicated to be incorporated by reference and set forth in its entirety herein.

For the purpose of promoting further understanding and appreciation of the present invention and its advantages, the following Examples are provided. It will be understood, however, that these Examples are illustrative and not limiting in any fashion.

EXAMPLE 1

Potentiodynamic Polarization Measurement for Localized Corrosion

Localized corrosion without $CO_2$ was demonstrated by electrochemical tests (cyclic potentiodynamic) performed according to ASTM G61. (ASTM G61-86. "Conducting Cyclic Potentiodynamic Polarization Measurements for Localized Corrosion Susceptibility of Iron, Nickel, or Cobalt Based Alloys," American Society for Testing and Materials). A stainless steel coupon designated as 410 steel (11.75 wt % Cr) was obtained from Metal Samples Cortest Instruments System. Stainless steel tubulars prepared from 410 steel often are used interchangeably with 13 Cr steel tubulars, which contain 13% Cr. Tubulars prepared from these two steel compositions are considered comparable by those skilled in the art. These tests accelerate the pitting process or localized corrosion where it would naturally occur. For the test results illustrated in FIGS. 1–4 and 7, an autoclave was pressurized with either a nitrogen or carbon dioxide atmosphere then heated to 300° F. (148.9° C.); the brine fluid in the autoclave was not de-aerated or purged with air. The test involves the initiating of polarization at –0.25 v less than the open circuit potential ($E_{corr}$) once the open circuit potential stabilizes to within 0.001 v for 30 sec. A stepwise potential difference is then applied between the 13 Cr coupon and a platinum electrode while the current is measured. This method is preferred over long-term general static weight-loss tests because pitting corrosion may take years to form. However in the field, once a pit forms, a tubing failure may occur in only a few weeks.

Figure 2:
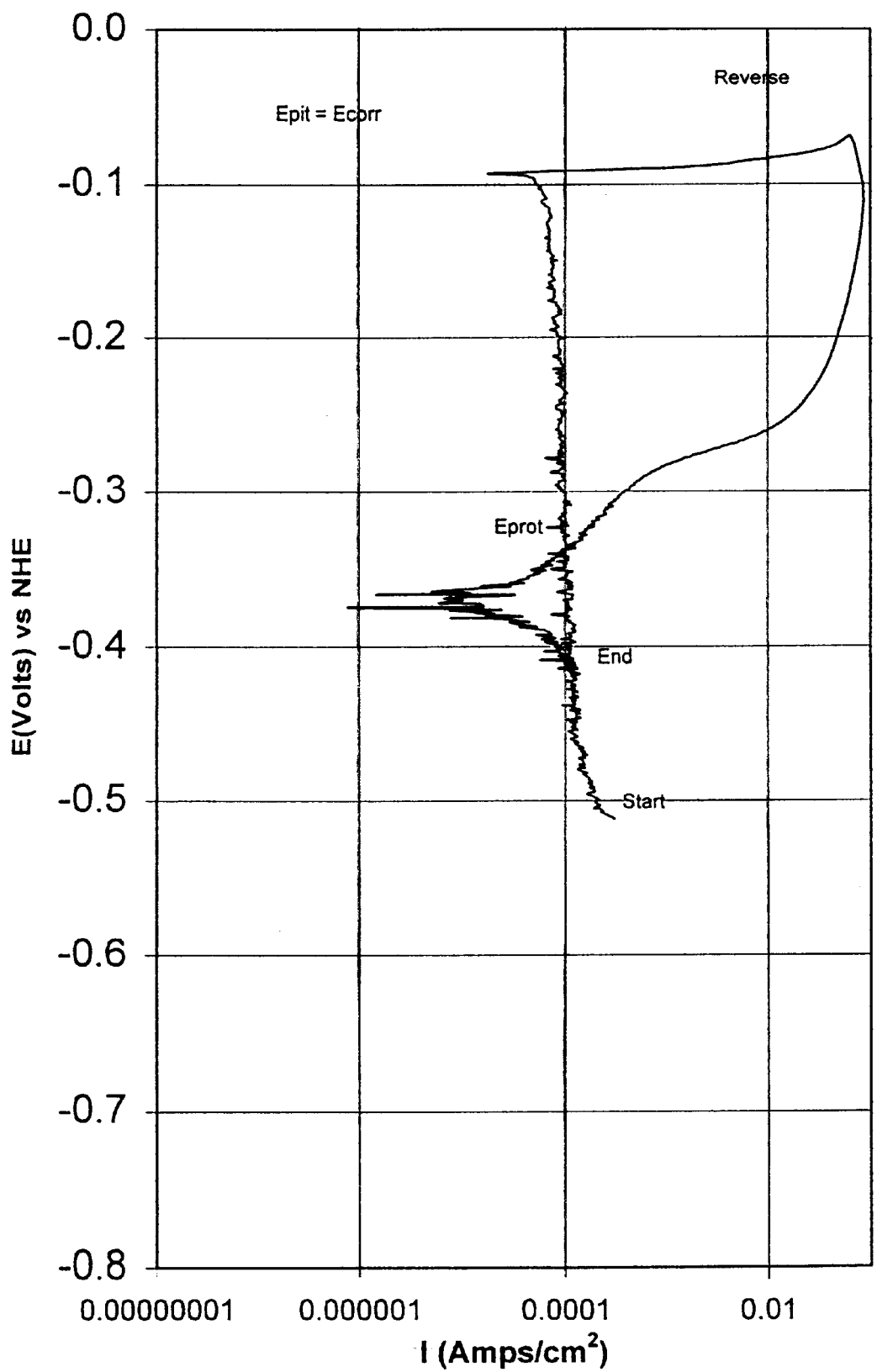
FIG. 2 is a graph illustrating the potentiodynamic polarization of a stainless steel coupon in a NaBr 9.5 ppg (1.14 g/ml) brine solution under $N_2$ at 750 psi and 300° F. (148.9° C.).

In FIGS. 1 and 2 the susceptibility to localized attack of 13 Cr coupons at 300° F. (148.9° C.) in both a 9.5 ppg (1.14 g/ml) NaCl and NaBr brine are illustrated, respectively. In FIG. 2, the 9.5 ppg NaBr solution is under a 750 psi $N_2$ atmosphere. The term $E_{pit}$ is defined as the pitting potential, or the potential when the metal suffers localized attack. At a potential designated as $E_{prot}$, the metal does not exhibit localized attack; instead the metal repassivates. The term $E_{corr}$ is an open circuit potential. At $E_{corr}$ the metal freely corrodes without any applied electrical potential.

In FIGS. 1 and 2, $E_{prot}$ is less than $E_{corr}$, and the metal suffers localized attack. However in FIG. 3 $E_{prot}$ is less than $E_{pit}$ and, therefore, the metal will not suffer from localized corrosion. Furthermore in FIG. 2, $E_{pit}$ equals $E_{corr}$, which indicates that the 13 Cr coupon has more localized corrosion in the 9.5 ppg (1.14 g/ml) NaBr solution than in the 9.5 ppg (1.14 g/ml) NaCl solution, shown in FIG. 1.

After the potentiodynamic tests, both coupons were examined for evidence of pitting and localized corrosion. The 410 steel coupon in the 9.5 ppg (1.14 g/ml) NaBr solution exhibited more extensive localized corrosion.

Figure 3:
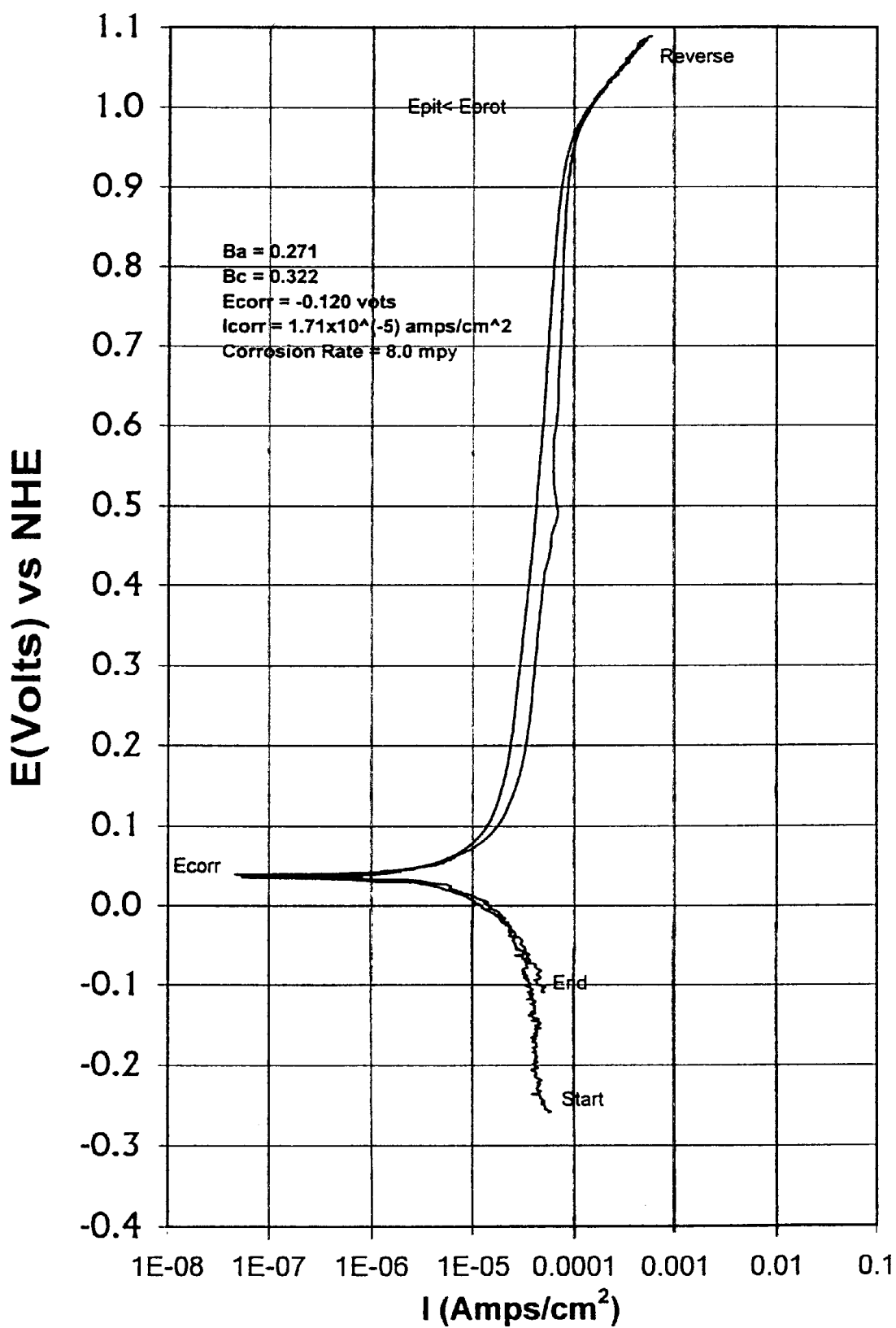
FIG. 3 is a graph illustrating the potentiodynamic polarization of a stainless steel coupon in a 9.5 (1.14 g/ml) carboxylate base fluid prepared according to one embodiment of the present invention under $N_2$ at 750 psi and 300° F. (148.9° C.).
Figure 4:
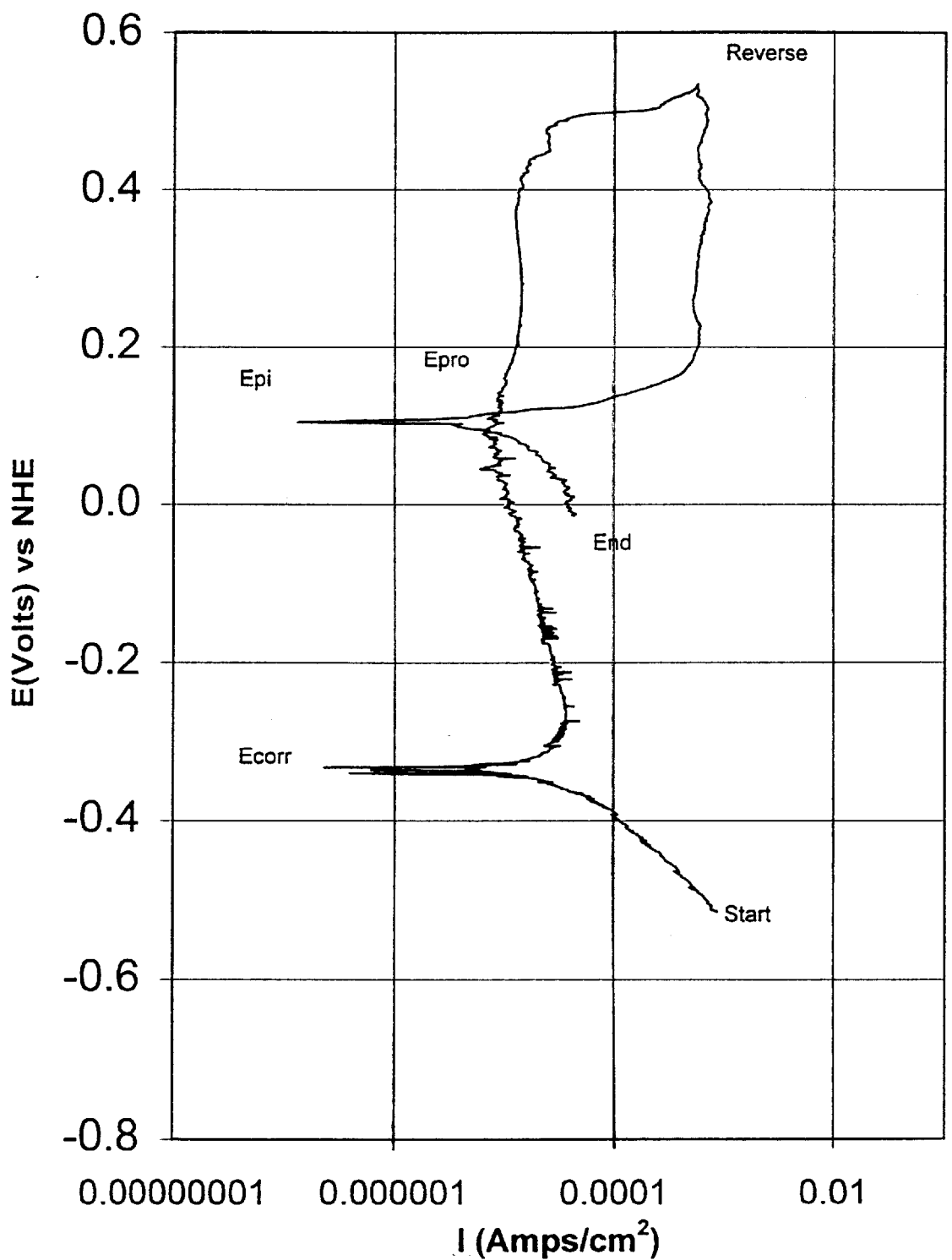
FIG. 4 is a graph illustrating the potentiodynamic polarization of a stainless steel coupon in a 10.5 (1.26 g/ml) carboxylate base fluid prepared according to one embodiment of the present invention under $N_2$ at 750 psi and 300° F. (148.9° C.).

In FIG. 3 the cyclic potentiodynamic test for 9.5 ppg (1.14 g/ml) sodium acetate base fluid is illustrated. In FIG. 4 the cyclic potentiodynamic test for a 10.5 ppg (1.26 g ml) sodium bromide/sodium acetate mixed brine solution is illustrated. The base fluids for both tests were heated to 300° F. (148.9° C.) and pressurized to 750 psig with $N_2$. In FIG. 3, the large increase in current at about 0.9 v is not the pitting potential in this case (post pits on the coupon did not occur). The current increase is probably due to the electrolysis of water. It can be seen in FIG. 4 that $E_{pit}$ is greater than $E_{prot}$, and $E_{prot}$ is greater than $E_{corr}$ indicating that localized corrosion of the 410 steel coupon may not occur under these conditions. Comparison of the tests results illustrated in FIGS. 1 and 2 to the test results illustrated in FIGS. 3 and 4 indicates that steel surfaces in contact with sodium acetate or sodium bromide/sodium acetate brine solutions suffer significantly less localized corrosion than the same steel surfaces in contact with either the sodium bromide or the sodium chloride brine solution. (See EG&G Princeton Applied Research, "Electrochemistry and Corrosion Overview and Techniques," Application Note Corr-4.).

For the 410 steel coupon used in the potentiodynamic test illustrated in FIG. 3, a uniform corrosion rate was calculated to be 8.0 mills/year (mpy) (0.31 mm per year) with the Tafel extrapolation using the following equation 1;

$$C.R._{(mpy)} = \frac{(1.248 \times 10^{16})(I_{corr}, \text{ in amps/cm}^2)(\text{Equiv. Wt., in g/equiv.})}{(\text{density in g/cm}^3)(96{,}000 \text{ coul./equiv.})} \quad (1)$$

where C.R. is the corrosion rate in mils per year (mpy), and $I_{corr}$ is the point of intersection of the anodic and cathodic branch of the Tafel plot.

EXAMPLE 2

Potentiodynamic Polarization Measurement for Localized Corrosion for a Sodium Acetate/Sodium Bromide Brine Fluid The results of a cyclic potentiodynamic test for a 10.5 ppg (1.26 g/ml) sodium acetate/sodium bromide fluid performed on a 410 coupon as described in Example 1 is illustrated in FIG. 4. The stainless steel coupon was cut from a rod designated as 410 containing 11.75% chromium and sold by Metal Samples Cortest Instruments System. The mixed brine fluid was prepared by mixing a 9.5 ppg (1.14 g/ml) solution of an aqueous sodium acetate brine and a 12.5 ppg (1.5 g/ml) NaBr brine fluid. The results of the potentiodynamic test of a 10.5 (1.26 g/ml) NaBr brine fluid resulted in a plot nearly identical to that obtained for the 9.5 (1.14 g/ml)

ppg NaBr. The effect of the mixed brine fluid caused the 410 coupon to be more resistant to pitting and localized corrosion, as indicated by an $E_{prot} > E_{corr}$.

Polarization tests were done on C4130 steel coupon in the sodium acetate brine fluid at temperatures up to 300° F. (148.9° C.). (Carbon steel coupons were cut from carbon steel rods sold under the trade name C4130 by Metal Samples Cortest Instruments System, containing 0.3% carbon.) Using the Tafel extrapolation, the corrosion rates were calculated to be less than 10 mpy (0.39 mm per year) at all tested temperatures. Static general weight-loss tests confirmed these results. These tests also confirmed the absence of pitting corrosion.

EXAMPLE 3
Static Corrosion Test with $CO_2$ Pressure

DeWaard and Loty developed an empirical equation (Equation 2) to model $CO_2$ corrosion in pipelines. Equation 3 incorporates the iron carbonate scale produced during the corrosion process. These equations are based on weight-loss tests in a stirred autoclave using 0.1% NaCl.

$$\text{Log}(CR/39.4 = 5.8 - 1,710/(273 - (t-32))/1.8)) + 0.67 \log(pCO_2) \quad (2)$$

$$\text{Log}(F_{scale} = 2,400/(273 + (t-32)/1.8) - 0.6 \log(pCO_2) \quad (3)$$

The nomenclature is as follows:
CR=Corrosion rate, mpy
t=Temperature, ° F.
$pCO_2 = CO_2$ partial pressure.

If $F_{scale}$ is less than 1, the corrosion rate obtained with Equation 1 is multiplied by $F_{scale}$ to obtain the actual corrosion rate. If $F_{scale}$ is greater or equal to 1, Equation 1 provides the actual corrosion rate.

To illustrate the severity of $CO_2$ corrosion on carbon steel, some electrochemical tests were done in 9.5 ppg (1.14 g/ml) NaCl and 9.5 ppg (1.14 g/ml) sodium acetate with 750 psig $CO_2$ at temperature.

Figure 5:
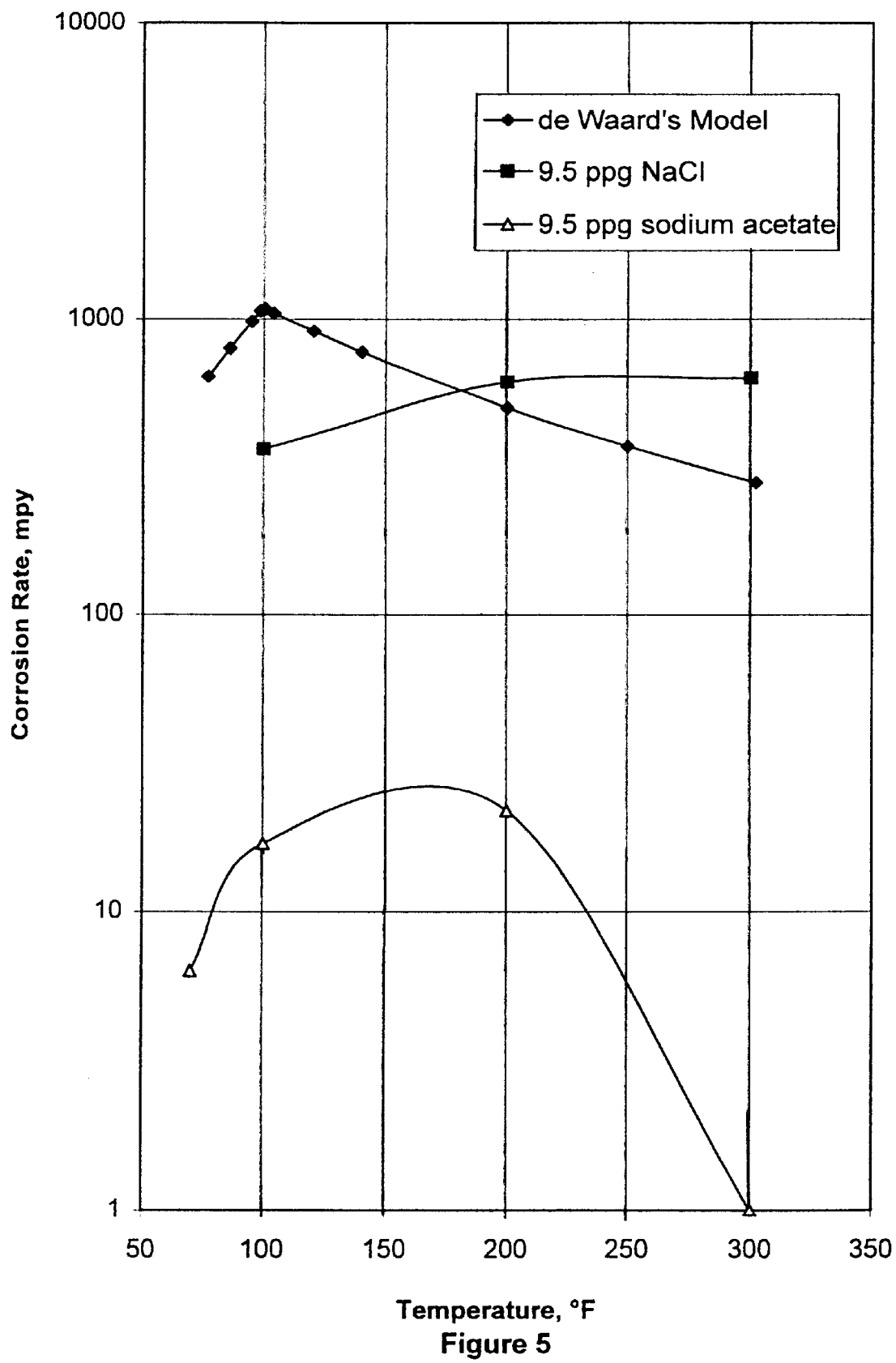
FIG. 5 is a graph illustrating the corrosion rate of a carbon steel coupon in brine solutions under $CO_2$ at 750 psi at various temperatures.

FIG. 5 illustrates the severity of $CO_2$ corrosion when these equations are plotted at a 750 psig $CO_2$ pressure. The equation predicts a maximum corrosion rate of 1,080 mpy at 100° F. (37.8° C.) that decreases with temperature due to the scaling effect (passivation) produced on the surface of the metal.

Tafel plots (FIG. 5) were done to calculate the corrosion rate for C4130 carbon steel submerged in a 9.5 ppg (1.14 g/ml) NaCl and a 9.5 ppg (1.14 g/ml) solution of the sodium acetate brine. These tests involved bubbling $CO_2$ in the solution until saturation was obtained, as indicated by a stabilization of pH. Then 500 psig $CO_2$ was applied. When the desired temperature was obtained, the $CO_2$ pressure was increased to 750 psig.

The 9.5 ppg (1.14 g/ml) NaCl solution shows lower corrosion rates than predicted up to about 175° F. (79.4° C.). This is due to less $CO_2$ dissolving in the brine, as opposed to 0.1% NaCl. However, the corrosion rate begins to increase above 600 mpy (23.6 mm per year) at 200–300° F. (93.3–148.9° C.) due to the chloride ion destabilizing the protecting iron carbonate film.

Figure 6:
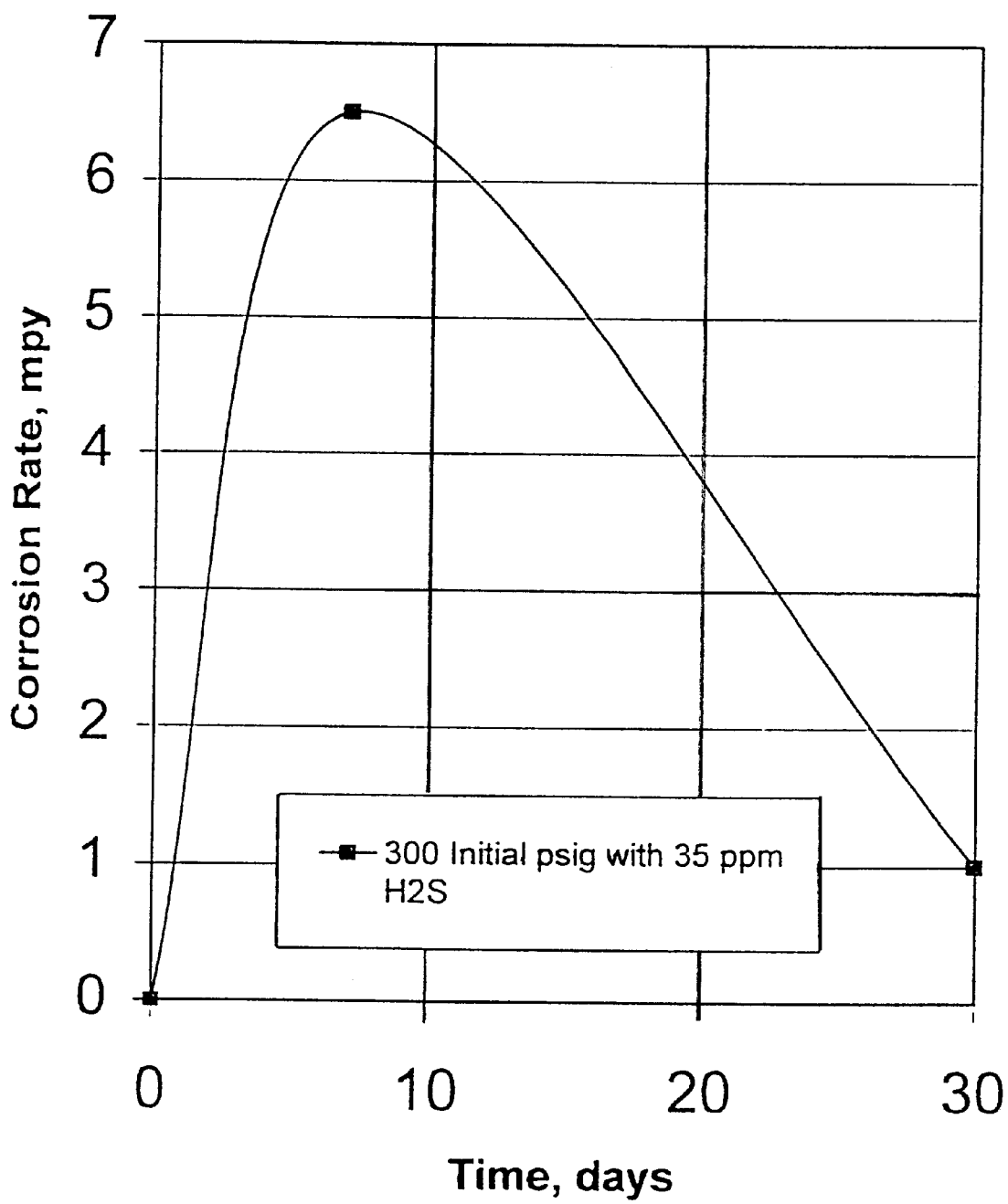
FIG. 6 is a graph illustrating the corrosion rate of a stainless coupon.

In FIG. 6 the corrosion rate of a stainless steel coupon cut from a pipe designated as 13 Cr containing 13% chromium and sold by Johnson Screens of Lafayette, La. was used. The 13 Cr steel coupon was immersed in a 9.5 ppg sodium acetate brine solution that contained 35 ppm hydrogen sulfide ($H_2S$). The brine solution containing the steel coupon and $H_2S$ was pressurized to an initial pressure of 300 psig. The corrosion rate was calculated according to Equation 4, $$C.R.(\text{mpy}) = 534 \frac{\Delta \text{ weight (mg)}}{D \cdot A \cdot t} \quad (4)$$

where D is the density of the coupon in $g/cm^3$, A is the surface area of the coupon in inches and t is time in hours. The corrosion rate was plotted verses time. The results indicate that with time, the corrosion rate decreases due to the continuing passivation reaction on the coupon surface. After 30 days, the corrosion rate decreased to almost 1 mpy.

Figure 7:
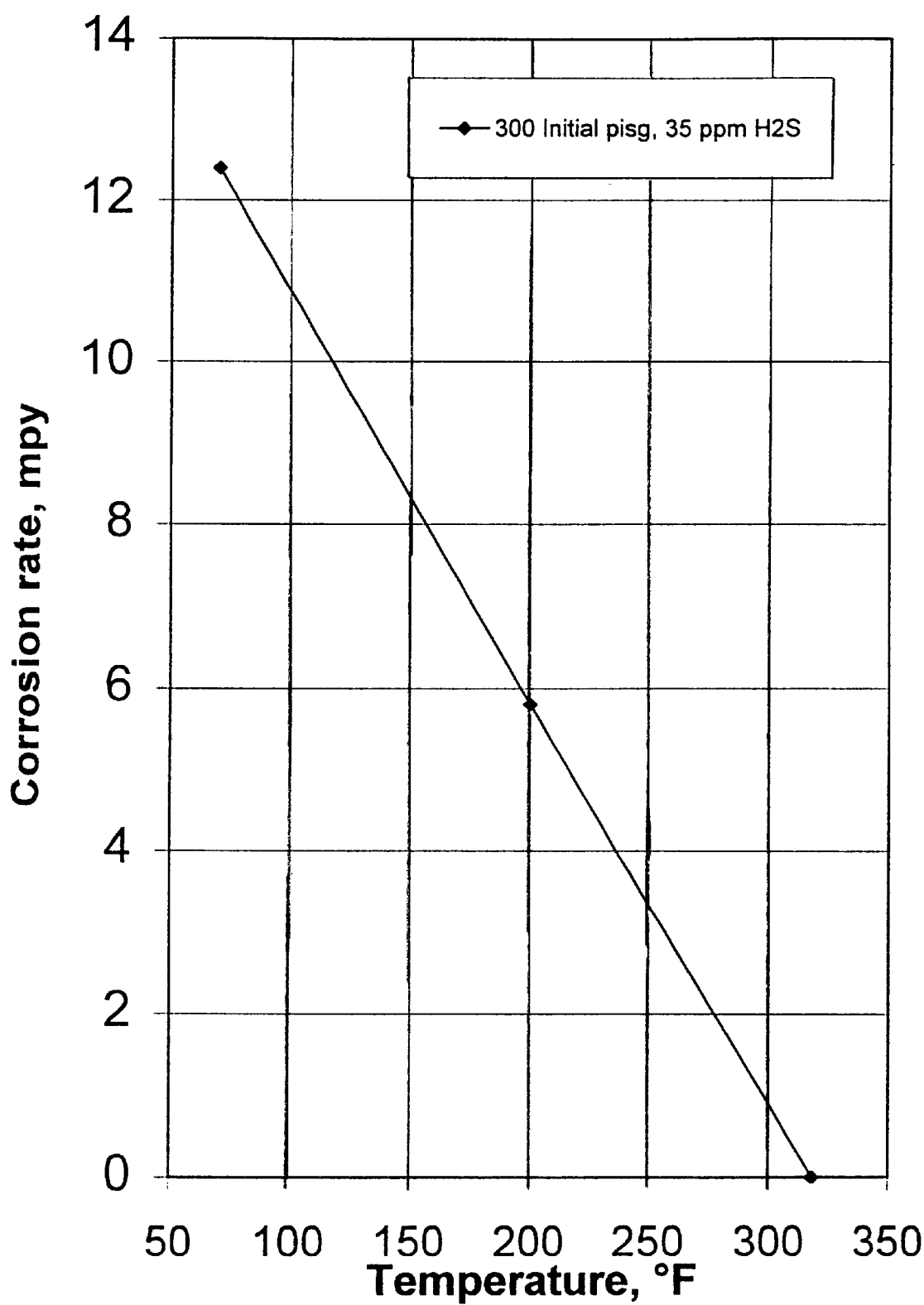
FIG. 7 is a graph illustrating rate of corrosion of a carbon steel coupon at various temperatures.

EXAMPLE 4
Seven Day Static Corrosion Test in Carbon Dioxide and Hydrogen Sulfide Atmosphere To illustrate the passivation rate of the carboxylate based fluid in the presence of $CO_2$ and $H_2S$ was examined in a series of 7-day tests, which were run at different temperatures on C4130 steel (see FIG. 7). The surface passivation rate increases with temperature; however, the rate at which the corrosion decreases is almost linear, and appears to be 0 at 320° F. (160° C.). In this fluid, the salt and the passivation agent are the same; therefore, it is conceivable that complete coverage of the coupon (or a pipe surface) with a passivation layer is possible. In fact, the presence of $CO_2$ appears to accelerate the completeness of this reaction, indicating a desirable synergistic effect. Other brine systems have the reverse effect, prompting the need for increased corrosion inhibitor loading and perhaps $CO_2$ scavengers.

Figure 8:
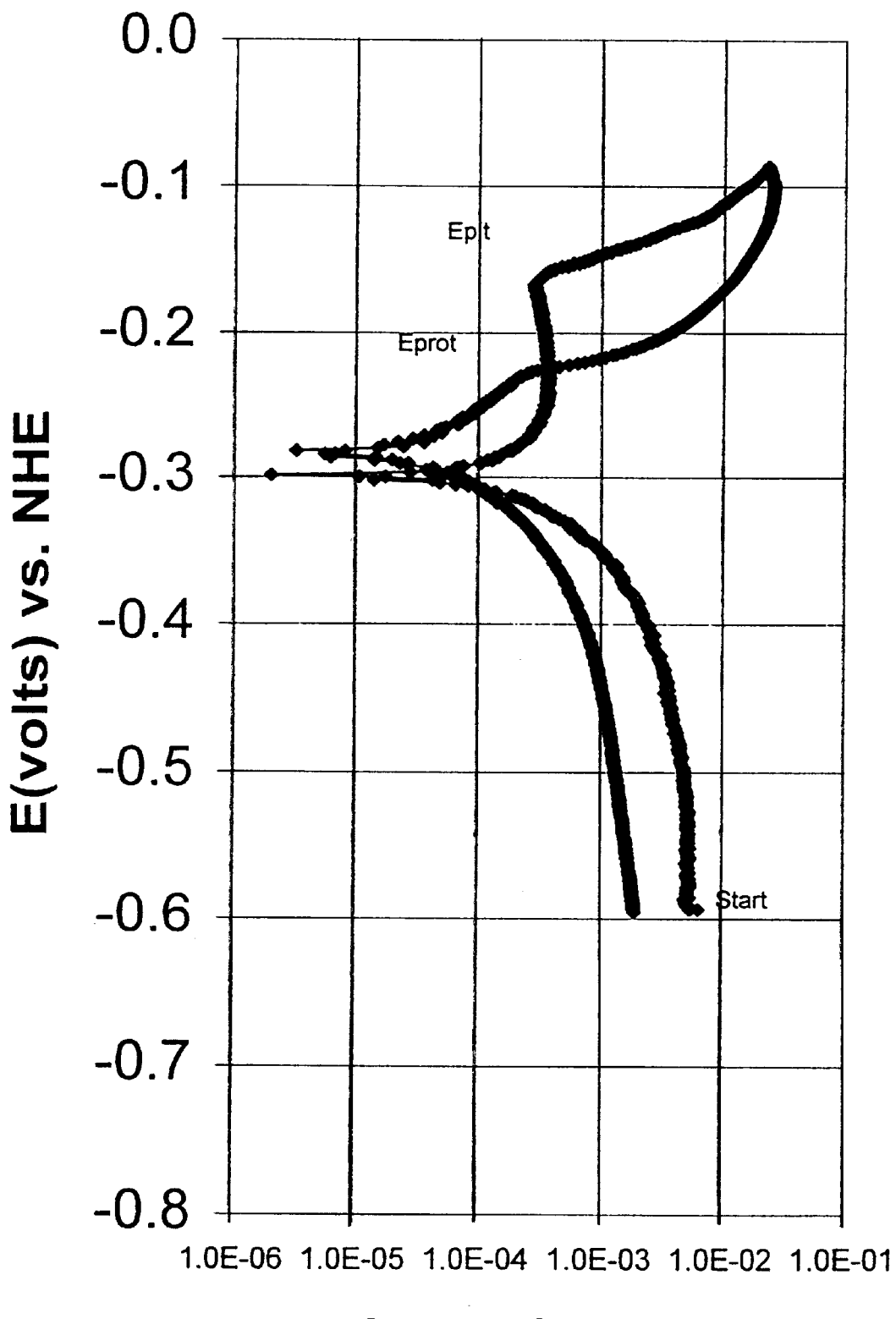
FIG. 8 is a graph illustrating the potentiodynamic polarization of a stainless steel coupon in a 9.5 ppg (1.14 g/ml) NaCl brine solution under $CO_2$ at 750 psi and 300° F. (148.9° C.).

EXAMPLE 5
Potentiodynamic Polarization Measurement for Localized Corrosion in the Presence of Carbon Dioxide To determine $CO_2$ effects on 410, a cyclic polarization test FIG. 8 was done with 9.5 ppg (1.14 g/ml) NaCl at 750 psig at 300° F. (148.9° C.). Under $CO_2$ atmosphere, $E_{prot}$ became greater than $E_{corr}$, whereas, without $CO_2$, $E_{prot}$ was less than $E_{corr}$. This suggests that the metal coupon could be susceptible to localized corrosion. However, with uniform corrosion rate of 171 mpy, a NaCl brine fluid is unacceptable for pipe used in drilling operations, particularly completion brines. This test was repeated using a 9.5 ppg (1.14 g/ml) sodium acetate brine fluid, and this test showed no indication that the metal coupon would suffer localized corrosion. The uniform corrosion rate was less than 20 mpy (0.79 mm per year).

EXAMPLE 6
Static Corrosion Test on Stainless Steel

Corrosion testing on stainless steel pipe was performed in a 12.5 ppg (1.5 g/ml) NaBr solution, and a 12.5 ppg (1.5 g/ml) $NaBr/NaHCO_2$ solution. Coupons were cut from a seamless 13 Cr steel tube (13% by weight Cr, 4 inches OD, 0.235 inches thick). Each coupon had a surface area of 1.44 $in^2$ (9.29 $cm^2$). The surface of each coupon was washed with water and acetone and then dried. The weight of each coupon was recorded. The coupons were oriented in a glass jar with the inside concave surface of the tubular placed against the bottom of the jar and immersed in the respective solvent. The solvents, including the coupons, were maintained at a temperature of 200° F. (93.5° C.) for seven days. After seven days the coupons were removed from the solution, cleaned as before and dried. The weight of each coupon was recorded. Each coupon was visually examined for corrosion. The results of the visual examination are listed in Table 1. The corrosion rate was calculated according to Equation 4;

$$C.R.(\text{mpy}) = 534 \frac{\Delta \text{ weight (mg)}}{D \cdot A \cdot t} \quad (4)$$

where D is the density of the coupon in g/cm³, A is the surface area of the coupon in inches and t is time in hours.

Evaluation of the results in Table 1 reveals the mixed salt system 12.5 ppg (1.5 g/ml) NaBr/NaO₂CH produced a low, uniform corrosion (0.60 mpy) (0.024 mm per year) and no signs of pitting or crevice corrosion. However, the brine containing only sodium bromide system had a higher uniform corrosion rate 2.87 mils per year (mpy) (0.11 mm per year). This coupon exhibited signs of crevice corrosion on the bottom surface and had pits at the top surface, whereas the brine containing sodium formate exhibited no evidence of localized corrosion.

TABLE 1

Seven Day Static Corrosion Test on 13 Cr Tubing at 200° F. (93.3° C.)

| Solution 50 ml | % NaBr | % NaHCO₂ | Initial PH | Final pH | Corrosion Rate, mpy | Comments |
|---|---|---|---|---|---|---|
| 12.5 ppg NaBr | 44.6 | 0.0 | 6.9 | 7.8 | 2.87 | Pitting and crevice corrosion |
| 12.5 ppg NaBr/ NaCHO₂ | 23.8 | 36.0 | 8.1 | 8.7 | 0.60 | No pitting or crevice corrosion |

EXAMPLE 7
Static Corrosion Test for 9.5 ppg (1.14 g/ml) Sodium Acetate

The corrosion rates for a carbon steel and a stainless steel coupon were evaluated in a 9.5 ppg (1.14 g/ml) aqueous solution containing sodium acetate. Carbon steel coupons were cut from carbon steel sheet sold under the trade name C4130 by Metal Samples, Inc, containing 0.3% carbon. Coupons of 13 Cr steel were prepared as described in Example 3. The coupons were weighed, then immersed in the sodium acetate solution inside a container. The container was pressurized to 300 psig at 318° F. (158.9° C.) with carbon dioxide. The coupons were recovered, weighed and visually inspected. The results are listed in Table 2. The 13 Cr coupon had demonstrable corrosion. Pitting and crevice corrosion was not observed on it. However, the C4130 steel coupon did have a tenacious scale that caused the coupon to gain weight during the test. This scale remained on the coupon after soaking in inhibited HCl, and therefore, the corrosion rate was reported as zero. In contrast, with conventional brines, corrosion rates for carbon steel in carbon dioxide environments have been reported to range from 50 mpy (1.97 mm per year) to over 1,000 mpy (39.4 mm per year), depending on temperature and pressure. (See C. de Waard and U. Lotz, "Prediction of CO₂ Corrosion of Carbon Steel" *Corrosion*/93, Paper 69, New Orleans, 1993).

TABLE 2

Corrosion of C4130 and 13 Cr Steel in 9.5 ppg Sodium Acetate 7 days, Static, 318° F., 300 psig Carbon Dioxide

| Coupon | Initial pH | Final pH | Corrosion Rate, mpy | Corrosion Rate lb/ft²* yr | Comments |
|---|---|---|---|---|---|
| 13 Cr | 8.4 | 6.1 | 8.1 | 0.33 | Uniform, no pitting |
| C4130 | 8.4 | 6.3 | 0.0 | 0.00 | Formed scale |

EXAMPLE 8
True Crystallization Temperature

The crystallization temperature of aqueous solution containing sodium bromide or sodium formate, either singly or combined, was determined. The results are listed in Table 3.

TABLE 3

| Density | | Specific Gravity | wt % NaBr | wt % NaHCO₂ | TCT ° F. | TCT ° C. |
|---|---|---|---|---|---|---|
| ppg | g/ml | | | | | |
| 10.5 | 1.26 | 1.259 | 27 | — | 1 | −17.2 |
| 11.2 | 1.34 | 1.343 | 34 | — | −14 | −25.6 |
| 11.5 | 1.38 | 1.379 | 37 | — | −18 | −27.8 |
| 12 | 1.44 | 1.439 | 41 | — | −2 | −18.9 |
| 12.5 | 1.5 | 1.499 | 45 | — | 33 | 0.56 |
| 10.5 | 1.26 | 1.259 | — | 38 | 49 | 9.4 |
| 10.5 | 1.26 | 1.259 | 16 | 14 | −6 | −21.1 |
| 11.2 | 1.34 | 1.343 | 27 | 10 | −22 | −30 |
| 11.5 | 1.38 | 1.379 | 32 | 6 | −27 | −32.8 |
| 12 | 1.44 | 1.439 | 38 | 3 | 0 | −17.8 |
| 12.9 | 1.55 | 1.547 | 26 | 31 | 57 | 13.9 |

TCT = true crystallization temperature

Analysis of the results listed in Table 3 indicate that a base fluid can be prepared that has a density of about 10.5 to about 11.5 and includes about 16 wt % to about 32 wt % sodium bromide and about 6 wt % to about 14 wt % sodium formate. This base fluid prepared with has a TCT lower than a brine fluid having the same density that comprising either sodium bromide or sodium formate individually.

EXAMPLE 9
Preparation of Dense Brine Solutions

A mixed salt solution having a density greater than either of the saturated solutions of the individual salts was prepared. The mixed salt solution was prepared by admixing NaBr and NaHCO₂ and 31 wt % NaBr.

The results listed in Table 4 reveals that the mixed NaBr/NaHCO₂ brine fluid has a density of 12.9 ppg (1.55 g/ml), which has a greater density than either sodium bromide or sodium formate solutions, individually.

TABLE 4

| | | Max. Density, @ 60° F. (15.6° C.) | |
|---|---|---|---|
| Solution | wt % salt | ppg | g/ml |
| NaHCO₂ | 45 | 10.9 | 1.31 |
| NaBr | 47 | 12.7 | 1.52 |
| NaHCO₂/NaBr | 26/31 | 12.9 | 1.55 |

EXAMPLE 10
Thermal Stability of Brine Solutions Containing Polysaccharides

Brine solutions having a density of 12.5 ppg (1.50 g/ml) brine containing 28.4 wt % NaBr, 23.8 wt % NaHCO₂ and polysaccharides were prepared. The polysaccharides investigated were hydroxy ethyl cellulose (HEC), xanthan gum, hydroxy propyl guar (HPG) and carboxy methyl hydroxy propyl guar (CMHPG). Hydroxy ethyl cellulose is incompatible with sodium formate or potassium formate solutions at densities greater than 10.0 ppg. However, the brine solutions with densities greater than 10.0 ppg (1.2 g/ml) can be viscosified with guar, hydroxypropyl guar and carboxymethyl hydroxyprophy guar (CMHPG).

Examination of the results listed in Table 5 shows that CMHPG thickens or has a larger consistency index (K)

values in a 12.5 ppg NaBr solution than HEC. However, to evaluate its performance for these systems, a modified Darcy's law shown by Eq. (5) and (6), $$v = \left(\frac{\phi n}{3n+1}\right)\left(\frac{8k}{\phi}\right)^{(n+1)/2n}\left(\frac{\Delta P}{2KL}\right)^{1/n} \quad (5)$$

where n=power-law exponent

K=consistency index, or viscosity at 1 sec$^{-1}$ shear rate $\phi$=porosity=void volume/total volume.

$$Q = \left(\frac{2\pi\phi L}{3n+1}\right)\left(\frac{8k}{\phi}\right)^{(n+2)/2n}\left(\frac{\Delta P}{2KL}\right)\left(\frac{1-n}{r^{1-n}-r_w^{1-n}}\right) \quad (6)$$

where r=formation radius in meters rw=well bore radius in meters (based on n and k shown in Table 5) (See Lau, H. C. "Laboratory Development and Field Testing of Succinoglycan as a Fluid-Loss Control Fluid," *SPE Drilling and Completion*, December 1994, pp 221–226) was used to model the solution's performance. The CMHPG solution exhibited less fluid loss than the HEC solution in a 12.5 ppg (1.50 g/ml) NaBr brine from 120° F. to 300° F. (48.9–148.9° C.) (see FIG. 8). Therefore, less CMHPG fluid is lost to the formation, which lowers the formation damage potential of the fluid and improves the cost basis of the fluid.

Figure 9:
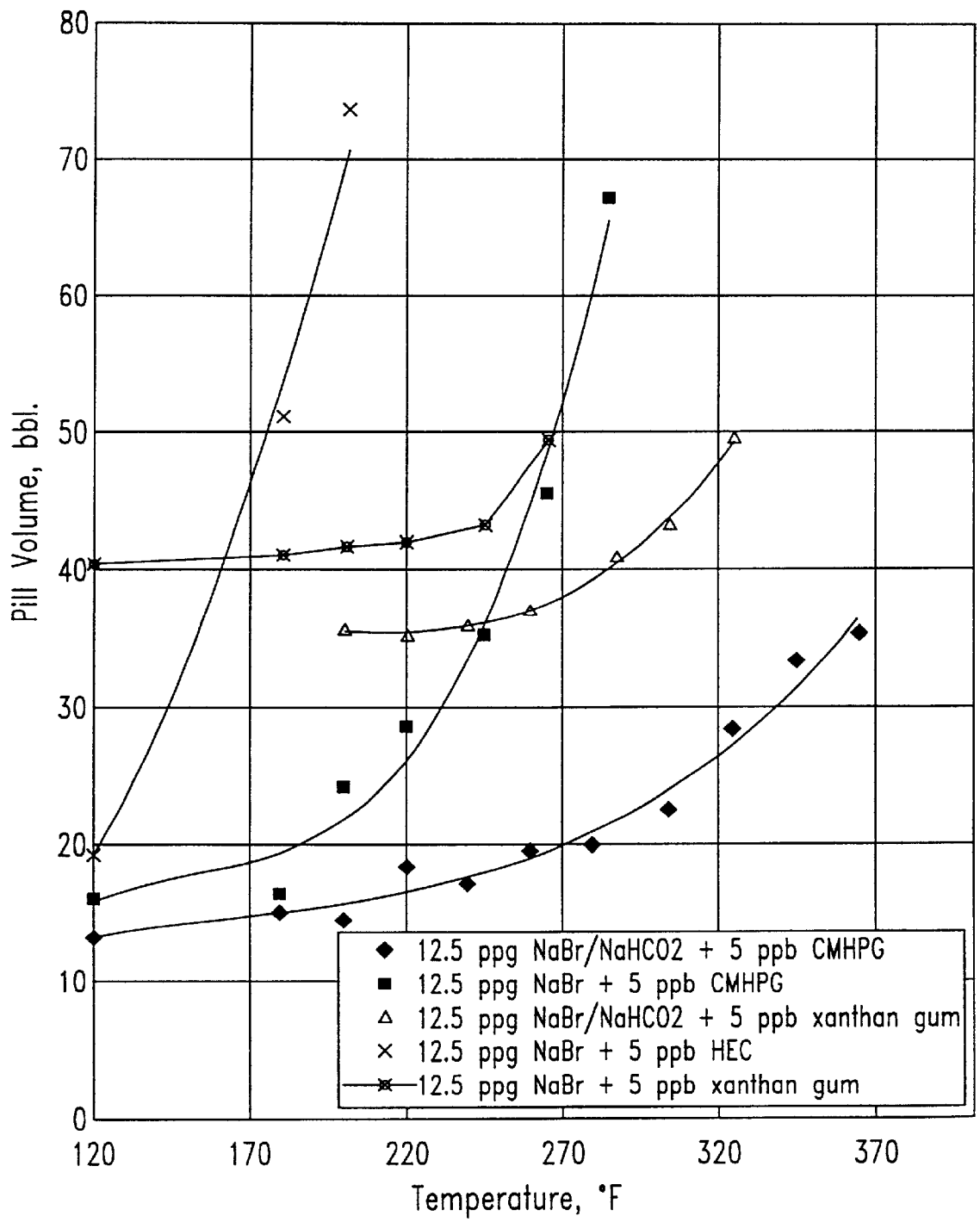
FIG. 9 is a graphic illustration if the amount of fluid loss in 24 hours for various fluids.

In FIG. 9, the calculated fluid loss is graphically illustrated and shows that at 180° F. (82.2° C.) for 24 hours about a 51 bbl pill (based on Equations (3) and (4)) would be needed if HEC is used, whereas only a 16 bbl CMHPG pill would be need. The model assumes that the Theological properties do not change with time. Using a 12.5 ppg (1.5 g/ml) NaBr/NaHCO$_2$ brine with CMHPG would improve fluid loss and lower the formation damage even further over 24 hours. Using the sodium formate/sodium bromide brine the CMHPG out-performed the more costly xanthan gum. At about 330° F. (165.6° C.) the brine containing xanthan gum exhibits a significant drop in viscosity, while brine solution containing CMHPG did not exhibit a significant drop in viscosity until about 365° F. (185° C.) (a 35° increase in thermal stability).

What is claimed is:

1. A method of inhibiting corrosion on a metal well surface comprising:

combining a brine with an aqueous composition having a density of 8 ppg or more at 70° F. and comprising carboxylate salt, and contacting the brine/carboxylate salt combination with the metal well surface.

2. The method of claim 1, wherein the carboxylate salt is present at a concentration of about 1 weight % to about 84 weight % of the aqueous composition.

3. The method of claim 1, wherein the carboxylate salt is a C1 to C5 carboxylate salt.

4. The method of claim 1 wherein the carboxylate salt is an alkali metal or alkaline earth metal carboxylate salt.

5. The method of claim 1 wherein the carboxylate salt is selected from the group consisting of sodium formate, sodium acetate, and sodium propionate.

6. The method of claim 1 wherein the aqueous composition is saturated with carboxylate salt.

7. The method of claim 1 wherein the aqueous composition is substantially free of solids.

8. The method of claim 1 wherein the aqueous composition is essentially halide free.

9. The method of claim 1 wherein the aqueous composition has a density of about 8 ppg to about 19 ppg at 70° F. and consists essentially of water and carboxylate salt.

10. The method of claim 8 wherein the aqueous composition consists essentially of water and an amount of the carboxylate salt sufficient to provide an aqueous composition having a density of about 8.4 ppg to about 9.8 ppg.

11. The method of claim 1 wherein the metal surface comprises stainless steel.

12. The method of claim 1 wherein the metal surface comprises carbon steel.

13. The method of claim 1 wherein the combination of the aqueous composition and the brine further comprises carbon dioxide or hydrogen sulfide or a combination thereof dissolved or entrained therein.

14. A method of inhibiting corrosion on a metal well surface comprising:

combining a brine with an aqueous composition having a density of 8 ppg or more at 70° F. and comprising carboxylate salt and halide salt, and contacting the brine/carboxylate salt combination with the metal well surface.

TABLE 5

Viscosification of 12.5 ppg solutions with 5 ppb of polymer

| Temp. | | NaBr 5 ppb HEC | | NaBr 5 ppb CMHPG | | NaBr/NaHCO$_2$ 5 ppb xanthan gum | | NaBr/NaHCO$_2$ 5 ppb CMHPG | |
|---|---|---|---|---|---|---|---|---|---|
| ° F. | ° C. | n | k, cP. | n | k, cP. | n | k, cP. | n | k, cP. |
| 120 | 48.9 | 0.254 | 31,666 | 0.177 | 40,619 | — | — | 0.225 | 38,484 |
| 180 | 82.2 | 0.391 | 10,843 | 0.218 | 29,673 | 0.198 | 17,511 | 0.205 | 33,456 |
| 200 | 93.3 | 0.434 | 7,413 | 0.231 | 25,540 | 0.186 | 18,909 | 0.163 | 37,760 |
| 220 | 104.4 | 0.566 | 4,416 | 0.252 | 21,258 | 0.177 | 91,274 | 0.228 | 25,900 |
| 240 | 115.6 | 0.571 | 2,544 | 0.276 | 17,252 | 0.177 | 18,928 | 0.175 | 31,008 |
| 260 | 126.7 | — | — | 0.313 | 13,204 | 0.174 | 18,564 | 0.191 | 25,848 |
| 280 | 137.8 | — | — | 0.369 | 8,807 | 0.176 | 17,070 | 0.159 | 27,119 |
| 305 | 151.7 | — | — | 0.674 | 600 | 0.180 | 16,314 | 0.156 | 24,149 |
| 320 | 160.0 | — | — | — | — | 0.198 | 14,278 | 0.187 | 18,222 |
| 340 | 171.1 | — | — | — | — | 0.405 | 1,865 | 0.141 | 17,810 |
| 365 | 185.0 | — | — | — | — | — | — | 0.043 | 22,337 |

15. A method of conditioning a metal well surface in contact with an aqueous brine having dissolved or entrained therein carbon dioxide comprising:

combining the brine with an aqueous composition having a density of 8 ppg or more at 70° F. and comprising carboxylate salt, and contacting the brine/carboxylate salt combination with the metal well surface.

16. The method of claim 15, wherein the carboxylate salt is present at a concentration of about 1 weight % to about 84 weight % of the aqueous composition.

17. The method of claim 15 wherein the carboxylate salt is a C1 to C5 carboxylate salt.

18. The method of claim 15 wherein the carboxylate salt is an alkali metal or alkaline earth metal carboxylate salt.

19. The method of claim 15 wherein the carboxylate salt is selected from the group consisting of sodium formate, sodium acetate, and sodium propionate.

20. The method of claim 15 wherein the aqueous composition is saturated with carboxylate salt.

21. The method of claim 15 wherein the aqueous composition has a density of about 8 ppg to about 19 ppg at 70° F.

22. The method of claim 15 wherein the aqueous composition has a density of about 8.4 ppg to about 9.8 ppg at 70° F.

23. The method of claim 15 wherein the metal surface comprises carbon steel.

24. The method of claim 15 wherein the aqueous composition further comprises a halide salt.

25. The method of claim 15 wherein hydrogen sulfide is present in the brine.

26. The method of claim 1 wherein the carboxylate salt comprises sodium bromide and sodium formate.

27. The method of claim 1 wherein the carboxylate salt comprises from about 16 to about 32 wt % sodium bromide and about 6 to about 14 wt % sodium formate.

28. The method of claim 1 wherein the aqueous composition has a density of between 8 and 19 ppg at 70° F.

29. A method to prevent corrosion on a metal well surface comprising contacting the metal surface with a composition comprising brine and a C1 to C4 carboxylate salt solution having a density of 8–19 ppg at 70° F. wherein the brine also contains carbon dioxide and/or hydrogen sulfide.

30. The method of claim 29 wherein brine/carboxylate salt composition further comprises a halide salt selected from the group consisting of alkali metal and alkaline earth metal halide salts.

31. The method of claim 30 wherein the halide salt is NaBr, NaCl, KCl, and or KBr, the carboxylate salt is a formate, an acetate, a propionate, a butyrate, and/or a 2-methyl propionate salt.

32. The method of claim 29 wherein the carboxylate salt is a lithium, potassium, sodium, rubidium or cesium salt.

33. The method of claim 29 wherein the brine/carboxylate salt composition is calcium free.

34. The method of claim 14 wherein the brine further comprises carbon dioxide dissolved or entrained therein.

35. The method of claim 14 wherein the brine further comprises hydrogen sulfide dissolved or entrained therein.

36. The method of claim 34 wherein the brine/carboxylate salt composition is calcium free.

37. The method of claim 14 wherein the halide salt is selected from the group consisting of alkali metal and alkaline earth metal halide salts.

38. The method of claim 14 wherein the halide salt is NaBr, NaCl, KCl and/or KBr.

39. The method of claim 14 wherein the carboxylate salt is a lithium, potassium, sodium, rubidium or cesium salt.

40. The method of claim 14 wherein the carboxylate salt is a formate, an acetate, a propionate, a butyrate, and/or a 2-methyl propionate salt.

* * * * *